Aug. 18, 1925.  
A. M. KRUGER  
GREASE GUN  
Filed Sept. 1, 1922
1,550,370
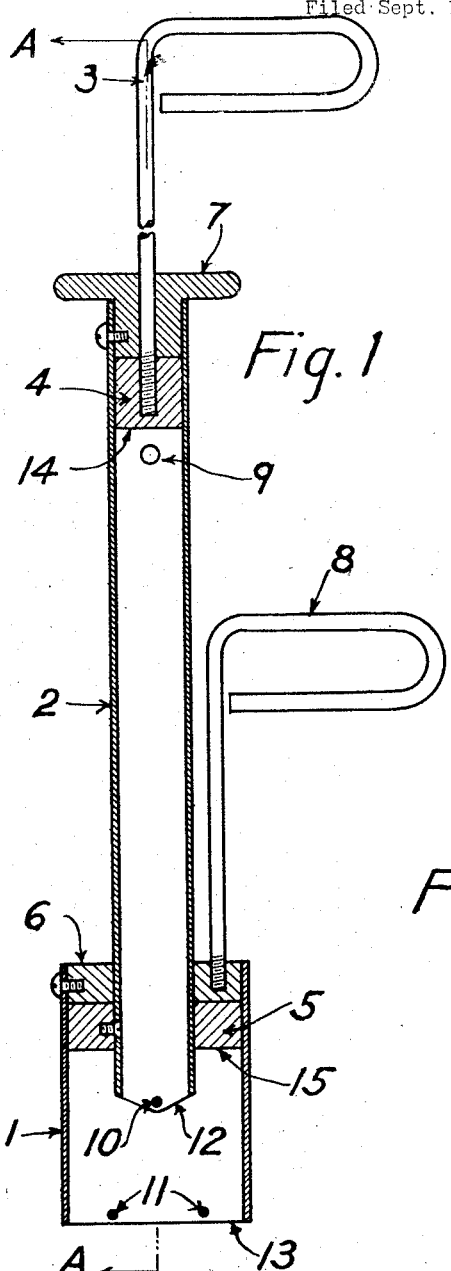
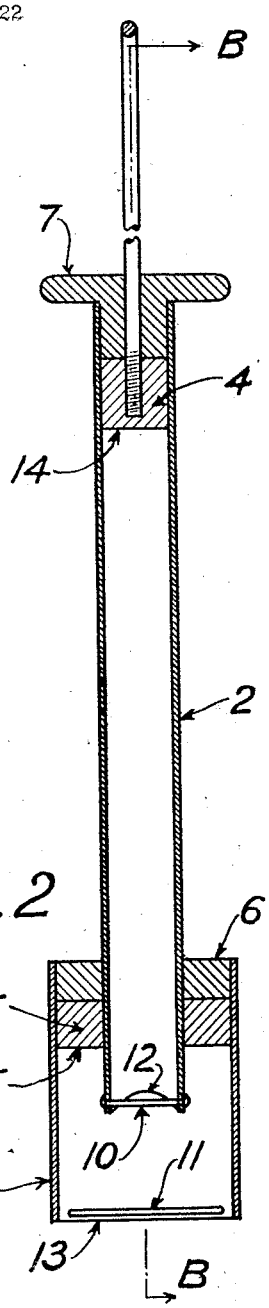
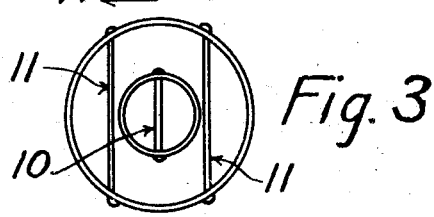
INVENTOR  
Albert M. Kruger Patented Aug. 18, 1925.

1,550,370

UNITED STATES PATENT OFFICE.

ALBERT M. KRUGER, OF EAST ORANGE, NEW JERSEY.

GREASE GUN.

Application filed September 1, 1922. Serial No. 585,792.

*To all whom it may concern:*

Be it known that I, ALBERT M. KRUGER, a citizen of the United States, residing in East Orange, in the county of Essex and State of New Jersey, have invented a new and useful Grease Gun, of which the following is a specification.

My invention relates to an apparatus designed to transfer substances from one container to another, the object usually being to transfer the substance from bulk to a receptacle where the said substance is desired to perform a useful purpose. A specific use of such an apparatus consists in the transferring of grease from bulk containers to machinery and to receptacles on machinery where grease is a desirable lubricant. Hence I designate the apparatus described in this specification by the name of grease gun.

My invention relates particularly to that style of grease gun appartus in which the substance to be transferred is introduced into the apparatus by suitable manipulation of the instrument itself, without direct contact of the grease on the fingers and without the use of a spoon, ladle, paddle or other means not forming part of the apparatus. My invention also relates to a type of this apparatus in which the material to be transferred is readily ejected from said apparatus by manipulation of the instrument by means of the handle or handles provided for the purpose. My invention further relates to a type of the appartus referred to in which handles are provided by which to manipulate the instrument effectively and correctly with a firm grasp of the hands, and by means of which to prevent the substance being transferred from coming in contact with and soiling the hands when the apparatus is being used.

The apparatus that I have invented can be used to advantage with various substances that are of a soft consistency, like paste or grease. Such uses for substances other than grease are obvious, and for the sake of clearness, I confine the specification that follows to terms of grease and grease handling.

I am aware that contrivances have heretofore been produced designed to transfer grease from bulk containers to other desired locations. The principle on which I base my invention is different from those employed in previous attempts. Instruments heretofore devised to produce the results obtained by the grease gun that I have invented (as described in the present specification) have attempted to make use of the principles by which a pump operates. In these attempts by others a cylinder has been used with an air-tight piston within the cylinder. By inserting the orifice at one end of the cylinder in a mass of grease and withdrawing the piston towards the other end of the cylinder, it was supposed that a more or less perfect vacuum would be formed within the cylinder, and that grease would be drawn into the cylinder to fill this vacuum. Such an action takes place when working with a liquid, but grease as ordinarily understood, at temperatures at which it is ordinarily used, does not flow like a liquid. The atmospheric pressure on the surface of a quantity of grease is not sufficient to overcome its tendency to retain its form. In practice no appreciable quantity of grease does flow into the orifice of such an apparatus where the principle of the pump is sought to be used. In order to use such an apparatus at all for placing grease in some desired location as on a machine, it is first necessary to fill the instrument with grease by external means, that is by pushing in the grease with the fingers, or with a putty knife, ladle, spoon or similar external contrivance independent of the instrument. The instrument is therefore of little advantage in applying grease to some desired location, since this can be done as readily directly, without the intervention of the instrument, and by the same means that would have to be used for filling the instrument. The grease gun that I have invented picks up the grease by a simple manipulation of the instrument itself, and thus constitutes a quick and clean contrivance for the purpose for which it is intended.

My invention operates on the principle of mechanically cutting a portion of grease when the operatively open end of the apparatus is inserted in a mass of the grease, and of pressing said portion of grease into that part of the apparatus from which discharge is to take place, this cutting and pressing being done in such a manner that a charge of grease remains in the apparatus when the apparatus is withdrawn from the mass of grease; and similarly by mechanical action there is practically complete discharge, the grease being cut (or in a sense scraped) off the piston which pushes the grease out from the instrument.

The objects of my invention are (1) to provide an instrument for transferring grease from a receptacle to some desired point of application, said instrument capable of receiving its charge by the manipulation of the instrument, and without the use of external filling means, such as the fingers, spoons, ladles, paddles or the like; this filling being automatic and self-filling in the sense that these terms are used for example in the case of a self-filling fountain pen. (2) To provide in such an instrument means whereby a substantial and predetermined quantity of grease may be charged into the instrument, and discharged through as small an orifice as may be required when filling a receptacle having an opening of limited size. (3) To provide in such an instrument an arrangement whereby a practically complete discharge is obtained by manipulation of the instrument, without the assistance of external means to scrape or wipe off the charge of grease that is being ejected. (4) To provide in such an instrument means by which to hold the instrument firmly in order to manipulate the instrument and its parts easily and correctly, and whereby to keep grease from coming in contact with the hands when manipulating the instrument.

I attain these objects by the arrangement illustrated in the accompanying drawing.

Figure 1 is a longitudinal section on Fig. 2 through the instrument along a plane near its axis, as indicated by the line BB. Figure 2 is a longitudinal section through the instrument along a plane AA at right angles to the plane of the section shown in Figure 1. Figure 3 is an end view of the orifice end of the instrument.

The part marked 2 is a tube of relatively small diameter. Around and concentric with tube 2 is the larger tube 1. The upper end of the tube 1 is closed by the cap 6, the latter fastened to the tube 1 and free to slide lengthwise on the tube 2. Near the lower end of tube 2 there is attached to the outside of tube 2 an annular piston 5 which is free to slide snugly within the tube 1. A piston 4 slides inside of the tube 2 and piston 4 is moved by means of the handle 3. A plug 7 closes the upper end of tube 2 and serves as a guide for the piston handle 3. The handle 8 is attached to the cap 6 on tube 1, and thereby operatively attached to tube 1. An air vent 9 is located in the tube 2 near its upper end. A wire 10 is fastened across at or near the lower, operatively open end of tube 2. Other wires 11 are similarly fastened across the lower, operatively open end of tube 1. The lower, cutting edges of the operatively open ends of the tubes 2 and 1 are indicated at 12 and 13 respectively. The lower or pushing side of the piston 4 is indicated at 14. The lower or pushing side of piston 5 is indicated at 15.

In operating the instrument it is first held by means of the handles 3 and 8, and extended as far as possible by drawing the handles as far apart as they will go. This draws the piston 4 against the plug 7, and the piston 5 against the cap 6, leaving the interior of the instrument open to receive the charge of grease. Now inserting the lower end of the instrument in a mass of grease, the tube 1, by means of its lower annular edge 13, cuts into the grease and allows the grease to enter within tube 1 in the form of a cylindrical plug equal in diameter to the inner diameter of tube 1. Tube 1 is of an appreciable diameter and therefor offers little interior friction to the passage of the grease entering it. By keeping the length of tube 1 sufficiently short in comparison with its diameter, I am, in this manner able to fill tube 1 with grease up to the lower surface 15 of the piston 5, piston 5 meanwhile being up as far as possible and touching cap 6. For ordinary purposes in the comparatively soft materials for which the instrument is designed, the cutting edges need not be sharpened, the usual thickness of suitable tubing being thin enough to serve as a cutting edge. The action is the same as that of a circular knife or chisel.

The next step in operating the instrument is to force tube 2 with its attached piston 5 down into the grease. This is done by pressing with the hand on the knob 7, the instrument and particularly the tube 1 meanwhile being held steady by means of the handle 8. While forcing piston 5 down on the grease plug contained within tube 1, I hold the lower edge 13 of tube 1, by means of handle 8, firmly against the flat bottom of the can or other object containing the grease to be transferred. By so doing, tube 1 is practically closed at its lower end 13, and the downward movement of tube 2 with its attached piston 5 forces the grease from within tube 1 into tube 2. The lower end 13 of tube 1 lies in a plane, and practically normal to the axis of tube 1, making it possible to obtain an operatively tight contact of the entire edge 13 against the plane surface usually forming the bottom of a grease container.

The grease gun is now ready to be removed from the container which holds the bulk of grease. To do this I first press down on knob 7, holding thereby the lower end of tube 2 against the bottom of bulk grease container. Next with the other hand holding handle 8, I raise tube 1 till the wires 11 strike against the lower side 15 of piston 5. I then give tube 1 a twisting motion about its longitudinal axis, still holding the tube 2 and piston 5 stationary by means of the knob 7. This causes the wires 11 to cut or scrape away grease attached to the lower face 15 of the piston 5, permitting the grease gun to be withdrawn from the can of grease quite free from particles of grease. If the bulk grease in the grease can is not high enough to reach up to the under surface of piston 5 so that the inside of tube 1 is not well filled with grease after one insertion into the bulk grease as above described, a twisting and upward movement of the tube 1 by means of handle 8, causes the wires 11 to cut off the plug of grease already contained within tube 1. Then the instrument can be withdrawn from the bulk grease with the quantity of grease already held in the instrument, because of the adhesion of the grease within tube 1 and the obstruction offered by wires 11 to the grease dropping out. One or two repetitions of inserting into the grease in this manner will fill the inside of tube 1 to the desired amount.

Tube 2 also has a wire 10 across its operatively open end to aid in cutting off the grease contained in tube 2 from the bulk of grease remaining in the bulk grease container. This is accomplished by giving tube 2 a twisting movement about its axis whereby the wire 10 acts as a cutter severing the bottom of the plug of grease in tube 2 from the grease remaining below tube 2 in the bulk grease container. If the tube 2 is of quite small diameter, the adhesion of the grease within tube 2 is sufficient to hold most of the grease contents of tube 2 without dropping out of it when the instrument is withdrawn from the bulk grease. In this event the function of the wire 10 is to sever the grease within tube 2 from the grease without said tube as above stated, and in addition to assist in retaining that portion of the grease near the operatively open end of tube 2.

The wires 11 are placed as close together as possible and still avoid striking the sides of that portion of the tube 2 which projects below the surface of piston 15. By lying as close as possible to the tube 2 when in contact with surface 15 of piston 5, the wires 11 serve best to clean off superfluous grease from piston 5, when the tube 1 and the wires 11 are rotated around the axis of said tubes, the rest of the instrument meanwhile being held stationary.

In order to keep the air within the tubes from offering resistance to the easy entrance of the grease, I provide an air vent 9 near the upper part of the instrument. The discharging end 12 of the inner tube 2 is arranged to project outside, beyond the plane of the operatively open end 13 of the tube 1, when piston 5 is pressed down completely to the point where surface 15 touches the wires 11. This makes it possible to insert the discharging end 12 of the small tube 2 into a correspondingly small opening in the receptacle to be filled with grease.

The instrument is discharged by pushing the piston 4, by means of handle 3, lengthwise within tube 2 till the lower surface 14 of piston 4 touches the wire 10. Then giving the piston 4 a twist around its axis by means of its handle 3, while the surface 14 is in contact with the wire 10, the grease finally adhering to piston 4 is cut or scraped off said piston 4 so as to drop away readily and practically clean from the instrument. To further facilitate complete discharge, the operatively open end 12 of the tube 2 is cut away in portions, leaving only a few small and insignificant points of contact and adhesion between the grease that is discharging and the inside of tube 2 when the face 14 of piston 4 lies in contact with the wire 10.

The piston faces 14 and 15 are best made plane and at right angles to the axis of the instrument so as to remain in contact with the wires 10 and 11 respectively during rotation of the piston faces against said wires. For the same reason the wires 10 and 11 are secured within their respective tubes in planes normal to the axes of the tubes.

By means of the annular cutting edges 13 and 12 of the tubes 1 and 2 respectively forming longitudinal grease cutters, the wires 10 and 11 forming transverse grease cutters, the tubes 1 and 2, and the pistons 4 and 5, said tubes, cutters and pistons operated by the above described manipulation of the instrument, I attain the first object of my invention.

I attain the second object of my invention by placing around the discharging tube 2 the large tube 1 to form a preliminary reservoir for imprisoning a substantial quantity of grease, then to be forced by means of the piston 5 into the inner tube whence final discharge takes place. By using this combination of tubes, each functioning similarly and in conjunction in receiving grease at their operatively open ends, I obtain an improvement in operation over what is possible with a single tube when the tube from which the grease is discharged is of a diameter as small as usually desired in practice, for the purpose of injecting grease into a small aperture.

By means of the wires 10 and 11, aided by the form of the inner tube's discharging end 12, said wires acting as scrapers on the piston faces 14 and 15 respectively, removing the grease from said piston surfaces when the instrument is manipulated as above described, I attain the third object of my invention.

I attach handle 3 to the end of the piston rod of piston 4, and another handle 8 to the tube 1. These handles being a suitable distance from the lower end of the instrument where more or less grease collects, the hands are thus kept clean from grease. The knob 7 also serves as a handle for holding and operating the instrument as above described, and knob 7 also being at a distance from the grease-touching lower end of the instrument, provides means for manipulation without soiling the hands. By means of these handles I attain the fourth object of my invention.

I claim:

1. In a grease gun, the combination with a charging tube having a lower open end of a receiving and discharging tube of reduced diameter axially alined with and slidable through said charging tube, said receiving and discharging tube having adjacent to its lower end an annular piston to fit and reciprocate within said charging tube, and a discharging piston arranged to reciprocate in said receiving and discharging tube.

2. In a grease gun, the combination with a charging tube having a lower open end providing a cutting edge of a receiving and discharging tube of reduced diameter having a lower open end portion alined with and slidable through said charging tube, said receiving and discharging tube having adjacent to its lower open extremity an annular piston to fit and reciprocate within said charging tube, a handle member attached to said charging tube to manipulate the same, and a discharging piston arranged to reciprocate in said receiving and discharging tube, said receiving and discharging tube having an air vent in its wall disposed below the normal raised piston of said discharging piston.

3. In a grease gun, the combination with a charging tube having a lower open end providing a cutting edge of a receiving and discharging tube of reduced diameter having a lower open end portion alined with and slidable through said charging tube, said charging tube being also free to turn on its longitudinal axis said receiving and discharging tube having adjacent to its lower open extremity an annular piston to fit and reciprocate within said charging tube, said charging tube having adjacent to its lower open end transverse cutting means, a handle member attached to said charging tube to manipulate the same, and a discharging piston arranged to reciprocate in said receiving and discharging tube, said receiving and discharging tube having an air vent in its wall disposed below the normal raised position of said discharging piston, and the lower open end of said receiving and discharging tube also having arranged therewith a transverse cutting means.

4. In a grease gun, the combination with a tubular barrel having a lower open end of means with which said barrel is slidably related for confining the grease about the open end of said barrel, said barrel having an external piston element reciprocable in said confining means for forcing the confined grease into the lower open end of said barrel, said confining means having a lower open end providing an annular cutting edge, transverse cutting wires adjacent to the open end of said confining means, and a discharging piston reciprocable in said barrel, said barrel having an air vent in its wall disposed below the normal raised position of said discharging piston, and the lower open end of said barrel also having a transverse cutting wire.

ALBERT M. KRUGER.